Patented Aug. 27, 1940

2,212,894

UNITED STATES PATENT OFFICE 2,212,894

POLYMERIZATION OF UNSATURATED ALDEHYDES

Clyve C. Allen, Berkeley, Calif., assignor to Shell Development Company, San Francisco, Calif., a corporation of Delaware No Drawing. Application November 8, 1937, Serial No. 173,535

12 Claims. (Cl. 260—67)

This invention relates to a process for effecting the polymerization of readily polymerizable unsaturated aldehydes to new and useful polymerization products which are characterized by being fusible and readily soluble in a wide variety of organic and other solvents, and it also relates to such new and useful polymers and polymer products.

Many unsaturated aldehydes, such as methacrolein and related alpha-substituted acroleins as well as some beta-substituted acroleins, in the pure state or in common solvents, are very unstable being particularly susceptible to autopolymerization resulting in the formation of infusible and insoluble solid polymers of little or no value. While such readily autopolymerizable unsaturated aldehydes have been regarded as potentially valuable raw materials in the production of useful resins and coating materials, and attempts have been made to overcome the tendency of these compounds to polymerize to form useless insoluble and infusible polymers, these attempts have met with no success.

It is an object of this invention to provide a method in accordance with which such readily autopolymerizable unsaturated aldehydes may be readily and substantially completely converted to valuable polymers which are fusible and substantially soluble in a wide variety of organic solvents such as the alcohols, esters, ketones, aromatic hydrocarbons, etc., and which are useful in the manufacture of coatings, films, threads, discs, molded articles, joining materials, and the like.

The process of the invention comprises effecting the desired polymerization reaction or reactions which will yield the valuable polymers herein described in the presence of autopolymerization inhibitors and under such conditions that the occurrence of the undesirable autopolymerization yielding infusible, insoluble products is inhibited or prevented. By operation in this manner, the readily autopolymerizable unsaturated aldehydes to which this invention relates can be converted in practical yields to soluble fusible polymer products.

The class of unsaturated aldehydes which may be polymerized to soluble thermoplastic polymers in accordance with the invention embraces unsaturated aldehydes possessing in their structure an unsaturated tertiary carbon atom linked directly to the aldehyde group, and halogen substituted acroleins such as alpha-chloracrolein, beta-chloracrolein and the like. A preferred sub-class of unsaturated aldehydes which are particularly susceptible to autopolymerization to useless polymers embraces the group of alpha-substituted acroleins of which methacrolein

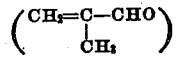

is the lowest member. These unsaturated aldehydes are conveniently represented by the general formula $$CH_2{=}C^{III}CHO$$
$$\phantom{CH_2{=}C^{II}}|$$
$$\phantom{CH_2{=}C^{II}}R$$

wherein the $C^{III}$ carbon atom is tertiary, that is, linked to three carbon atoms, and wherein R is an organic radical. R may be an alkyl radical as methyl, ethyl, propyl, butyl, amyl, etc.; an alkenyl radical as ethenyl, propenyl, butenyl, etc.; an aryl or aralkyl radical as phenyl, benzyl, phenylethyl, naphthyl, styryl, xylyl, etc.; an alicyclic radical as cyclopropyl, cyclobutyl, cyclopentyl and the like as well as suitable substitution products of the above radicals and their homologues and analogues. As examples of suitable substituted hydrocarbon radicals, R may represent radicals such as $-CH_2Cl$, $-CH_2OH$, $-CH_2-CH_2OH$, $-CH_2-CHOH-CH_3$, $-COOH$,

and the like.

For inhibiting the undesired autopolymerization reaction during the execution of the process whereby the desired polymerization of the unsaturated aldehyde to fusible soluble products is effected, any sufficiently effective member of the class of substances known to the art as anti-oxidants may be used. It is only necessary that the selected agent be effective to substantially inhibit autopolymerization of the unsaturated aldehyde during the execution of the process of the invention. Among the organic inhibitors which may be successfully employed are the phenolic compounds, the amines, the organic hydroxy amino compounds, the mercaptans and the like. Suitable amines are the primary, secondary and tertiary aliphatic and aralkyl amines as the methyl amines, the ethyl amines, the propyl amines, the mixed alkyl amines such as ethyl propyl amine, etc., benzyl amine, the aromatic amino compounds such as aniline, the toluidines, the xylidines, methyl aniline, triphenyl amine, the phenylene diamines and the like and their homologues, analogues and suitable substitution products. Representative suitable organic hydroxy amino compounds are among others; the alkylolamines as monoethanolamine, diethanolamine, triethanolamine, the mono-, di- and tripropanolamines, -butanolamines, -pentanolamines, etc.; the aldehyde-ammonia and aldehyde-amine condensation products such as acetaldehyde-ammonia, isobutyraldehyde-ammonia, benzaldehyde-ammonia, acetaldehyde-methyl amine, acetaldehyde-aniline, etc.; the amino phenols, the amino naphthols, the amino cresols and the like and their homologues, analogues and suitable substitution products. Among the inorganic autopolymerization inhibitors which may be successfully employed are the heavy metals, particularly copper and the copper alloys, the heavy metal oxides, the metal salts, the halogens, sulphur, selenium, tellurium, etc., and suitable compounds of these elements.

A particularly suitable, and, in some cases, preferably employed group of autopolymerization inhibitors embraces the phenolic compounds. The term "phenolic compound" as used herein and in the appended claims designates those organic compounds which contain an aromatic radical and at least one hydroxy group linked to a carbon atom embraced in the nucleus of an aromatic radical. A phenolic compound may be monohydric or polyhydric and one or more hydrogen atoms thereof may be replaced by suitable inorganic or organic substituents. Suitable phenolic compounds are, among others, the following: phenol, the cresols, the naphthols, the anthrols, the xylenols, cumenol, carvacrol, thymol, eugenol, catechol, resorcinol, hydroquinone, orcinol, guaiacol, phloroglucinol and the like and their homologues, analogues and suitable substitution products.

The invention is not limited to the use of any specific amount of the autopolymerization inhibitor. It is only necessary that the specific inhibitor or mixture of inhibitors be present in an effective amount. What is an effective amount will depend upon the specific inhibitor used, the particular unsaturated aldehyde polymerized, and the conditions under which the polymerization operation of the invention is executed. In the majority of cases, and particularly when the inhibitor is a phenolic compound, the stabilizers have the desired effectiveness when employed in concentrations of from about 0.002% to about 2% by weight of the unsaturated material treated.

As an example of a suitable mode of executing the process of the invention, the following procedure may be followed. The unsaturated aldehyde from any convenient source is stabilized against autopolymerization by incorporating therewith a stabilizing amount of an autopolymerization inhibitor, and the stabilized aldehyde is charged to a suitable reaction vessel. In the case of the very readily autopolymerizable unsaturated aldehydes, for example, methacrolein, it may be desirable to incorporate the autopolymerization inhibitor with the freshly distilled aldehyde just before effecting the desired reaction. In some cases, however, the stabilized unsaturated aldehyde may be stored for relatively long periods before being used in the execution of the process of the invention. If desired, the inhibitor may be added to the aldehyde after it has been charged to the reaction vessel. The stabilized unsaturated aldehyde is then treated, in the presence of such an amount of the selected autopolymerization inhibitor or mixture of such inhibitors that autopolymerization is substantially avoided, with a polymerization inducing agent under polymerizing conditions whereby the desired polymerization of the unsaturated aldehyde to a fusible polymer product which is substantially soluble in oxygenated organic solvents and aromatic hydrocarbons occurs.

A preferably employed reaction vessel comprises a kettle of the desired size equipped with mechanical stirring or agitating means and means for heating or cooling its contents. The reaction is preferably effected with the unsaturated aldehyde in the liquid phase. The reaction may or may not be effected in the presence of a solvent or diluent. For example, the polymerization may be effected in the presence of water and/or other solvent or diluent materials as alcohols, ethers, hydrocarbons, etc., which are preferably inert with respect to the unsaturated aldehyde and autopolymerization inhibitor under the conditions at which the desired polymerization reaction is to be effected.

Any suitable polymerization agent which is capable of inducing the desired polymerization of the stabilized unsaturated aldehyde to the desired soluble and fusible polymer product may be used. Basic polymerization agents, such as the basic oxides, basic hydroxides, basic-acting salts and the like are advantageously employed in the majority of cases. A particularly suitable group of basic polymerization agents includes the alkali metal oxides, the alkali metal hydroxides, the alkali metal alcoholates and the basic-acting alkali metal salts, which agents are preferably employed in the temperature range of from about $-10°$ C. to $50°$ C. The polymerization agents may be employed per se as solids, or they may be applied in solution in water or other suitable solvents therefor. For example, the alkali metal hydroxides and alcoholates are conveniently employed as solids, in concentrated aqueous solution, or in alcoholic solution. Conveniently employed basic salts are the alkali metal cyanides. They are preferably employed in aqueous solution or alcoholic aqueous solution.

The desired polymerization reaction is preferably executed at temperatures below about $50°$ C. and at about atmospheric pressure, although higher temperatures and pressures may be used when necessary or desirable. The temperature to be employed in each particular case is dependent upon the particular unsaturated aldehyde polymerized, the particular polymer product desired, the particular polymerization agent, and the form in which the particular polymerization agent is employed. Aqueous and solid alkali metal hydroxides may be advantageously used at temperatures of from about $0°$ C. to about $50°$ C. Alcoholic potassium hydroxide has been successfully used at temperatures as low as from about $-5°$ C. to $+5°$ C. When alkali metal hydroxide solutions are employed the temperature is easily controlled and the formation of useless polymer products avoided by adding the stabilized unsaturated aldehyde to the well-agitated and cooled caustic solution. In general, rather large proportions of the basic polymerization agent are employed so that disproportionation can take place at a relatively fast rate over and above other reactions.

At the conclusion of the polymerization reaction, the polymer product may be recovered from the reaction mixture in a variety of suitable manners obvious to those skilled in the art. Suitable representative modes of recovery are described in detail in the specific examples.

For the purpose of making the invention clear and readily understandable, it will be described with particular reference to its application to the polymerization of methacrolein

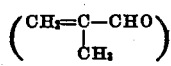

a typical and readily available unsaturated aldehyde of the class to which the process of the invention is applicable, to valuable polymer products which are fusible and soluble in a wide variety of solvents. It is to be understood that the same principles and mode of operation are applicable to the treatment of the other members of the class of unsaturated aldehydes herein described, and that there is no intent to restrict the invention to the polymerization of methacrolein.

Methacrolein, in the pure state or in solution in common organic solvents therefor, undergoes autopolymerization (spontaneous self-condensation) resulting in the formation of an infusible solid which is insoluble in all of the common organic solvents and of little or no value. The autopolymerization of methacrolein appears to be of the activated ethylenic bond type of polymerization followed by cross linkages due to free aldehyde groups. Heat, light, and contact with many acidic and basic compounds appears to accelerate this autopolymerization reaction. In accordance with the process of the invention, the autopolymerization reaction is inhibited while other polymerization reactions of the Cannizzaro, aldol and benzoin type which yield valuable fusible and soluble polymer products are made to take place exclusively or at least to very materially predominate.

The methacrolein polymers obtained in accordance with the process of the invention in the presence of different autopolymerization inhibitors and different polymerization agents under different polymerizing conditions are similar in physical as well as chemical properties. They appear to consist for the most part of polymerized unsaturated glycol esters and unsaturated glycols with smaller amounts of polymerized unsaturated acids. The polymer products are fusible. The softening point appears to be a function of the average molecular weight of the polymer product obtained. The polymers are in general readily soluble in oxygenated organic solvents such as alcohols (ethanol, butanol, etc.), ketones (acetone, methyl ethyl ketone, methyl hexyl ketone, etc.), esters (ethyl acetate, butyl acetate, etc.) and aromatic hydrocarbons (benzol, xylol, etc.). They are substantially insoluble in water and aliphatic hydrocarbons.

The following specific examples further illustrate the nature and mode of execution of the invention. The examples are not to be taken as limiting the invention to the particular reactants, proportions and products specified.

*Example I*

About 200 c. c. (168 grams) of methacrolein were stabilized against autopolymerization by mixing therewith about 0.7% of hydroquinone. The stabilized methacrolein was slowly added, with vigorous stirring and while maintaining the temperature at from about 20° C. to about 30° C., to about 1000 gm. of an aqueous 40% sodium hydroxide solution, the addition consuming about 3 hours. The hydroxide solution was decanted from the solid polymer product. The decanted solution was practically free of methacrolein, indicating substantially complete reaction. The solid resin was dissolved in 95% ethyl alcohol and the solution neutralized with hydrochloric acid and refluxed with a small amount of benzoyl peroxide for about 8 hours. The cooled solution was run into cold water. The fibrous resin precipitated was washed with water and dried under vacuum.

About 152 gm. of the purified product were obtained, representing a yield of about 90.5% on the applied methacrolein.

The product was a brittle fusible solid having a softening point of from about 25° C. to 70° C. It was substantially insoluble in water and aliphatic hydrocarbons, and only partially soluble in ethers. It was completely soluble in alcohols, esters and aromatic hydrocarbons from which solutions it forms clear adherent films.

The polymer product had a molecular weight of about 367, corresponding to the polymerization of five molecules of methacrolein and attachment of one molecule of water. The product analyzed as follows:

| | Per 100 grams |
|---|---|
| Acid equivalents | 0.044 |
| Hydroxyl equivalents | 0.120 |
| Carbonyl equivalents | 0.157 |
| Saponifiable equivalents | 0.225 |

*Example II*

About 168 gm. (2.4 mols) of methacrolein were stabilized against autopolymerization by incorporating therewith about 0.7% of hydroquinone. The stabilized methacrolein was added to about 1000 gm. of an aqueous 40% sodium hydroxide solution dropwise over a period of about 3 hours, the mixture being vigorously stirred and maintained at a temperature of from about 2° C. to 5° C. The sodium hydroxide solution was then decanted from the precipitated polymer product and the latter dissolved in ethyl alcohol and the resulting solution neutralized with concentrated hydrochloric acid at about 0° C. Sodium chloride was then filtered from the alcoholic solution and the filtrate evaporated to dryness under vacuo. The residue was a semi-resinous material weighing about 180 gm.

The product at this stage was water soluble. It was dissolved in water and acidified with hydrochloric acid whereupon about 100 gm. of an acid-insoluble resin was precipitated. The precipitated resin was dissolved in ethyl alcohol and the resulting solution refluxed with benzoyl peroxide for about 8 hours. The polymer was then precipitated from the alcohol solution by pouring it into a boiling aqueous 3% hydrochloric acid solution.

The polymer product was a fusible solid melting from about 50° C. to 100° C. It was substantially insoluble in water and aliphatic hydrocarbons, and only sparingly soluble in ethers. It was readily soluble in alcohols, esters, ketones and aromatic hydrocarbons. Analysis showed the product to be very similar in composition to the product described in Example I.

*Example III*

About 168 gm. of methacrolein which had been previously stabilized by the addition thereto of about 0.7% of hydroquinone were vigorously stirred with about 20 gm. of solid sodium hydroxide (pellets) for about 60 hours. The solid caustic was removed by decantation and the polymer product treated with hydrochloric acid to recover the product as described in Example II.

The polymer product, which had substantially the characteristics of the polymer obtained in accordance with the operation of Examples I and II, was obtained in good yield.

Substantially the same type of polymer product was obtained when methacrolein, which had been stabilized against autopolymerization, was polymerized by treatment with sodium methallylate at about 0° C. in the manner above described.

Example IV

About 84 gm. (1.2 mols) of methacrolein were stabilized against autopolymerization by the addition thereto of about 0.7% of hydroquinone. The stabilized methacrolein was dissolved in about 500 c. c. of 95% ethyl alcohol and the resulting solution stirred and maintained at a temperature of about −5° C. to +5 C. while about 50 c. c. of a 33% alcoholic (ethyl) potassium hydroxide solution was added thereto dropwise over a period of about 2.5 hours. All of the methacrolein was reacted under these conditions. Water was then added, and the alcohol was removed by distillation whereby a part of the polymer product precipitated. After substantially all of the alcohol had been removed, the residue was extracted with ether and the ether extract evaporated. The ether extract yielded about 46 gm. of polymer product as a residue (Sample I). The aqueous residue remaining after the ether extraction was made acidic (about 5N) by addition of concentrated hydrochloric acid and again extracted with ether. The evaporation of this final ether extract solution yielded about 44 gm. of polymer product (Sample II). The final aqueous residue, after removal of dissolved ether, contained only traces of organic matter.

Analyses of the products were as follows:

|  | Sample I | Sample II |
| --- | --- | --- |
| Molecular weight (acetic acid) | 240 | 184 |
| Acid No. (equivalents per 100 gm) | 0.062 | 0.0115 |
| Saponification No. (equivalents per 100 gm) | 0.371 | 0.825 |
| Acetyl No. (equivalents per 100 gm.) | 0.291 | 0.47 |
| Carbonyl value (equivalents per 100 gm.) | 0.66 | 0.10 |

The polymer products were liquids insoluble in water and soluble in the common organic solvents including aliphatic hydrocarbons.

Example V

About 84 gm. (1.2 mols) of methacrolein were stabilized by mixing therewith about 0.7% of hydroquinone. The resulting stabilized mixture was dissolved in about 500 c.c. of benzol. This solution was stirred and maintained at about 0° C. while about 20 gm. of a 3N solution of sodium methallylate were added to it dropwise. The mixture was then allowed to stand for about 20 hours while gradually warming to room temperature. At the end of this time, 500 c.c. of water were added and the benzene removed by azeotropic distillation. The remaining mixture of water and polymer product was acidified with hydrochloric acid, and the polymer product separated, washed with water, and dried. About 86 gm. of polymer product were obtained.

The product, which contained about 42% of saponifiable material, had a molecular weight of about 340 in acetic acid. It was a fusible solid substantially insoluble in water and aliphatic hydrocarbons but readily soluble in alcohols, esters, ketones and aromatic hydrocarbons.

Example VI

About 168 gm. (2.4 mols) of methacrolein were stabilized against autopolymerization by the incorporation therewith of about 0.7% of hydroquinone. The thus stabilized methacrolein was added dropwise to a well stirred solution consisting of about 250 c.c. of 95% ethyl alcohol, 200 c.c. of water, and 28 gm. (0.43 mol) of potassium cyanide, which was maintained at a temperature of about 40° C. The addition of the methacrolein required about 2 hours. The reaction vessel was capped by a well-cooled (acetone-solid carbon dioxide) reflux condenser. After the addition of the methacrolein, the reaction mixture was refluxed for about 4 hours. Under these conditions, all but a trace of the methacrolein reacted to give a homogeneous reaction mixture.

The polymer product may be recovered from the reaction mixture in a variety of suitable manners, the method of recovery apparently having little influence on the character of the isolated polymer product. In this particular case, 0.43 mol of concentrated hydrochloric acid was added and after refluxing for a few minutes, the mixture separated into two layers. Water was removed from the crude product by the addition of ether and calcium chloride. The alcohol was then distilled off and the residue vacuum distilled to a temperature of about 215° C. under a pressure of about 5 mm. of Hg.

The distillate (about 52 gm.) had a molecular weight of about 212 (in benzene). It was soluble in oxygenated organic solvents and aromatic hydrocarbons. It was insoluble in water, and only slightly soluble in aliphatic hydrocarbons. The product corresponded closely to the product which should be obtained by the condensation of three molecules of methacrolein plus one of water.

The bottoms (residue of the vacuum distillation) which weighed about 120 gm. consisted of a polymer product having a molecular weight of about 660 (in benzene). It was readily soluble in oxygenated organic solvents and aromatic hydrocarbons, but insoluble in water and aliphatic hydrocarbons. This main polymer product appears to be a mixture corresponding to the formula $(C_4H_6O)x.H_2O$ and having 1 hydroxyl group, 1 to 1.5 reactive carboxyl groups, and 1 to 2 unreactive oxygen atoms per formula weight.

In each of the operations described in the above examples, substantially the same results are obtained when an effective amount of some other anti-oxidant or autopolymerization inhibitor is used in lieu of hydroquinone. Representative inhibitors such as pyrogallol, the cresols, the naphthols, resorcinol, ethanolamine, acetaldehyde-ammonia, aniline, amino phenol, phenylene diamine, copper, copper alloys, sulphur, selenium, tellurium, the halogens, etc.; are very suitable and their use results in polymer products having the same general character as those described in the examples. Comparable results are also obtined when other active polymerizing agents such as the basic oxides, other basic metal hydroxides, other alcoholates, the phenolates and other basic salts are employed in the execution of the process of the invention.

I claim as my invention:

1. A process for the production of valuable fusible and soluble polymers from autopolymerizable unsaturated aldehydes of the group consisting of alpha-substituted acroleins containing an unsaturated tertiary carbon atom linked directly to the aldehyde group and the alpha- and beta-substituted acroleins wherein the substituent is a halogen atom which comprises adding an autopolymerization inhibitor to the unsaturated aldehyde in a stabilizing amount up to about 2% by weight of the aldehyde, and treating the thus stabilized unsaturated aldehyde with a basic polymerization agent under polymerizing conditions whereby the unsaturated aldehyde undergoes polymerization to yield a fusible polymer product which is substantially soluble in oxygenated organic solvents and aromatic hydrocarbons.

2. A process for the production of valuable fusible and soluble polymers from unsaturated aldehydes possessing an olefinic linkage between two aliphatic carbon atoms one of which is tertiary and linked directly to the aldehyde group which comprises adding an autopolymerization inhibitor to the unsaturated aldehyde in a stabilizing amount up to about 2% by weight of the aldehyde, and treating the thus stabilized unsaturated aldehyde with a basic polymerization agent under polymerizing conditions whereby the unsaturated aldehyde undergoes polymerization to yield a fusible polymer product which is substantially soluble in oxygenated organic solvent and aromatic hydrocarbons.

3. A process for the production of valuable fusible and soluble polymers from unsaturated aldehydes possessing an olefinic linkage between two aliphatic carbon atoms one of which is tertiary and linked directly to the aldehyde group which comprises adding a phenolic compound to the unsaturated aldehyde in a stabilizing amount up to about 2% by weight of the aldehyde, treating the thus stabilized unsaturated aldehyde with a basic compound selected from the group consisting of the alkali metal oxides, hydroxides, alcoholates and basic salts at a temperature of from about −10° C. to about 50° C. whereby the unsaturated aldehyde undergoes polymerization to yield a fusible polymer product which is substantially soluble in oxygenated organic solvents and aromatic hydrocarbons, and recovering the polymer product from the reaction mixture.

4. A process for the production of valuable fusible and soluble polymers from unsaturated aldehydes possessing an olefinic linkage between two aliphatic carbon atoms one of which is tertiary and linked directly to the aldehyde group which comprises adding hydroquinone to the unsaturated aldehyde in a stabilizing amount up to about 2% by weight of the aldehyde, treating the thus stabilized unsaturated aldehyde with an alkali metal hydroxide at a temperature of from about 0° C. to about 50° C. whereby the unsaturated aldehyde undergoes polymerization to yield a fusible polymer product which is substantially soluble in oxygenated organic solvents and aromatic hydrocarbons, and recovering the polymer product from the reaction mixture.

5. A process for the production of valuable fusible and soluble polymers from methacrolein which comprises adding an autopolymerization inhibitor to methacrolein in a stabilizing amount up to about 2% by weight of the methacrolein, treating the thus stabilized methacrolein with a basic polymerization agent under polymerizing conditions whereby it undergoes polymerization to yield a fusible polymer product which is substantially soluble in oxygenated organic solvents and aromatic hydrocarbons, and recovering the polymer product from the reaction mixture.

6. A process for the production of valuable fusible and soluble polymers from methacrolein which comprises adding a phenolic compound to methacrolein in a stabilizing amount up to about 2% by weight of the methacrolein, treating the thus stabilized methacrolein with a basic compound selected from the group consisting of the alkali metal oxides, hydroxides, alcoholates and basic salts at a temperature not greater than about 50° C. whereby the methacrolein undergoes polymerization to yield a fusible polymer product which is substantially soluble in oxygenated organic solvents and aromatic hydrocarbons, and recovering the polymer product from the reaction mixture.

7. A process for the production of valuable fusible and soluble polymers from methacrolein which comprises adding hydroquinone to methacrolein in a stabilizing amount up to about 2% by weight of the methacrolein, treating the thus stabilized methacrolein with sodium hydroxide at a temperature not greater than about 50° C. whereby the methacrolein undergoes polymerization to yield a fusible polymer product which is substantially soluble in oxygenated organic solvents and aromatic hydrocarbons, and recovering the polymer product from the reaction mixture.

8. A process for the production of valuable fusible and soluble polymers from methacrolein which comprises adding hydroquinone to methacrolein in a stabilizing amount up to about 2% by weight of the methacrolein, treating the thus stabilizing methacrolein with potassium cyanide at a temperature of about 40° C. whereby it undergoes polymerization to yield a fusible polymer product which is substantially soluble in oxygenated organic solvents and aromatic hydrocarbons, and recovering the polymer product.

9. In a process for treating methacrolein with a basic polymerization agent under polymerization conditions to effect its polymerization to a fusible polymer product which is substantially soluble in oxygenated organic solvents and aromatic hydrocarbons, the step of controlling the polymerization so as to form in predominating amount the desired polymer product by incorporating an autopolymerization inhibitor with the methacrolein in a stabilizing amount up to about 2% by weight of the methacrolein.

10. The product prepared according to the process of claim 1.

11. The product prepared according to the process of claim 2.

12. The product prepared according to the process of claim 5.

CLYVE C. ALLEN.